United States Patent
Bothe et al.

(10) Patent No.: US 7,048,672 B2
(45) Date of Patent: May 23, 2006

(54) METHOD FOR CONTROLLING THE SHIFTING OF AN AUTOMATED TWIN-CLUTCH TRANSMISSION

(75) Inventors: Edgar Bothe, Peine (DE); Uwe Hinrichsen, Braunschweig (DE); Axel Schamscha, Leiferde (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 11/157,029

(22) Filed: Jun. 20, 2005

(65) Prior Publication Data

US 2005/0272559 A1    Dec. 8, 2005

Related U.S. Application Data

(63) Continuation of application No. PCT/EP2003/013526, filed on Dec. 2, 2003.

(51) Int. Cl.
*B60W 10/04* (2006.01)
*B60W 10/10* (2006.01)
*G06F 17/00* (2006.01)
*G06F 19/00* (2006.01)
*G06F 7/00* (2006.01)

(52) U.S. Cl. .................. 477/110; 477/111; 701/64; 701/66

(58) Field of Classification Search ........... 477/107, 477/110, 111; 701/55, 56, 64, 66, 67
See application file for complete search history.

(56) References Cited

U.S. PATENT DOCUMENTS

| 5,915,512 | A | 6/1999 | Adamis et al. |
| 6,090,008 | A * | 7/2000 | Hoshiya et al. ............. 477/84 |
| 6,881,171 | B1 * | 4/2005 | Kuhstrebe et al. .......... 477/78 |
| 2002/0037790 | A1 | 3/2002 | Carl et al. |
| 2004/0230360 | A1 * | 11/2004 | Matsumura et al. ......... 701/51 |

FOREIGN PATENT DOCUMENTS

| DE | 35 46 454 A1 | 2/1987 |
| DE | 199 23 089 A1 | 11/2000 |
| DE | 100 14 879 A1 | 10/2001 |
| DE | 100 58 043 A1 | 5/2002 |

* cited by examiner

*Primary Examiner*—Tisha Lewis

(57) ABSTRACT

A method for controlling the shifting operation of an automated twin-clutch transmission includes executing a shifting operation between a load gear and a target gear assigned to a first transmission unit by using an intermediate gear assigned to a second transmission unit. The engine speed is adjusted to reach the synchronous speed of the target gear at the end of the shifting operation. At the start of the shifting operation an initial target speed gradient is set such that the engine speed reaches the synchronous speed at the end of the shifting operation based on an estimated total shifting time. The actual shifting progress is determined during the shifting operation and is compared with the estimated shifting progress. The target speed gradient is adjusted to the actual shifting progress in case the actual shifting progress and the estimated shifting progress deviate from one another.

13 Claims, 2 Drawing Sheets

METHOD FOR CONTROLLING THE SHIFTING OF AN AUTOMATED TWIN-CLUTCH TRANSMISSION

CROSS-REFERENCE TO RELATED APPLICATION

This is a continuing application, under 35 U.S.C. § 120, of copending international application No. PCT/EP2003/013526, filed Dec. 2, 2003, which designated the United States; this application also claims the priority, under 35 U.S.C. § 119, of German patent application No. 102 61 872.0, filed Dec. 20, 2002; the prior applications are herewith incorporated by reference in their entirety.

BACKGROUND OF THE INVENTION

1. Field of the Invention

The invention relates to a method for controlling the shifting of an automated twin-clutch transmission including a first transmission unit with a first transmission input shaft, a first engine clutch and a first group of gears and a second transmission unit with a second transmission input shaft, a second engine clutch and a second group of gears, with which a shifting operation is executed between a load gear and a target gear assigned to the same transmission unit by using an intermediate gear assigned to the other transmission unit. The shifting operation is performed as a multiple shifting operation including the following shifting steps: engaging the intermediate gear, performing a clutch change-over from the engine clutch of the load gear to the engine clutch of the intermediate gear, disengaging the load gear, engaging the target gear, performing a clutch change-over from the engine clutch of the intermediate gear to the engine clutch of the target gear, and adjusting the engine speed of the assigned drive engine to reach the synchronous speed of the target gear at the end of the shifting operation.

The configuration of a twin-clutch transmission is for instance disclosed in German Published Non-Prosecuted Patent Application No. DE 35 46 454 A1, which describes a gearshift transmission for an automobile with a twin-clutch. The twin-clutch transmission has a first engine clutch, a first transmission input shaft, and a first group of gears that form a first transmission unit, and a second engine clutch, a second transmission input shaft, and a second group of gears that form a second transmission unit. By engaging one of the gears, it is possible to connect the related transmission input shaft to a common transmission output shaft. In the usual alternate assignment of gears, the even gears are assigned to the first transmission unit and the odd gears are assigned to the second transmission unit. In such an assignment of gears, the shifting operation is simple and sequential from an engaged load gear to the next higher or next lower target gear, i.e. in each case to the target gear assigned to the other transmission unit, as long as the clutch can be locked passively. This sequential shifting operation spans from opening the engine clutch assigned to the transmission unit of the target gear, engaging the target gear, a subsequent overlapped opening of the engine clutch assigned to the transmission unit of the load gear and closing the engine clutch assigned to the transmission unit of the target gear. Thus the power transmission takes place alternately via the first transmission unit with the first engine clutch and the first transmission input shaft and via the second transmission unit with the second engine clutch and the second transmission input shaft. A special advantage of this transmission is that there is no interruption in the traction force and/or the thrust force during the gear change, which is why the twin-clutch transmission is included in the category of powershift transmissions. Since a manual activation of two engine clutches and the gear shifting with two temporarily simultaneously engaged gears would be considerably complex from the mechanical point of view, twin-clutch transmissions are designed to be automated as far as is known. This means, both the activation of the engine clutches and also the gear shifting take place through the use of assigned actuating drives that can be activated electromagnetically, using an electric motor, using a pressure medium, for instance hydraulically or in any other manner.

In certain operating situations that are substantially dependent on a sudden change of the slope of the roadway, for instance a transition from a street extending horizontally to a street rising steeply and/or the performance requirement of the driver, for instance rapidly tromping on the accelerator pedal for rapid acceleration (kick-down), a simple sequential shifting operation cannot sufficiently meet the requirements of the motor control and shift control and/or the requirements of the driver. This case necessitates a shifting operation in which at least one gear is skipped, i.e. the load gear and the target gear are assigned to the same transmission unit. For the purpose of avoiding interruptions in the traction force and/or thrust force even in this case, it is preferred to carry out such a shifting operation as a so-called multiple shifting operation by using an intermediate gear that is assigned to the other transmission unit.

In order to carry out the fastest multiple shifting operation possible, the required speed is adjusted, i.e. the engine speed is conventionally adjusted to the effective synchronous speed of the target gear in the assigned engine clutch during the shifting operation. For this a target speed gradient is predetermined, according to which the engine speed is made to attain the synchronous speed of the target gear at the end of the shifting operation through the use of the motor control and/or the overlap control of the engine clutches. If the actual shifting progress, i.e. the progression in terms of time of the individual shifting steps and the resulting total shifting time correspond to the underlying estimated total shifting time, then the engine speed reaches the synchronous speed of the target gear exactly at the desired point of time. Due to changing operating conditions, particularly different operating temperatures, wear and tear of the engine clutches and of the shifting and synchronization elements of the gear, the partial shifting times of the individual shifting steps and thus even the total shifting time of the multiple shifting operation cannot be determined precisely beforehand. As a result the engine speed mostly does not reach the synchronous speed at the desired point of time. If the shifting operation, i.e. the execution of the individual shifting steps proceeds faster than expected, then the shifting progression hurries ahead of the speed adjustment. This means at the end of the shifting operation a waiting period can be anticipated in which the engine speed still passes through the remaining speed difference for reaching the synchronous speed. If, on the other hand, the shifting operation proceeds slower than expected, then the speed adjustment hurries ahead of the shifting progression. This means toward the end of the shifting operation, the engine speed must remain at the synchronous speed of the target gear that was reached too early until the conclusion of the shifting operation. The first case involves a genuine delay of the entire shifting progression, while in the second case the driver experiences an apparent, possibly unpleasant delay of the shifting progression due to the temporarily constant engine speed.

SUMMARY OF THE INVENTION

It is accordingly an object of the invention to provide a method for controlling a shifting progression which overcomes the above-mentioned disadvantages of the heretofore-known methods of this general type and which improves the speed adjustment.

With the foregoing and other objects in view there is provided, in accordance with the invention, a method for a transmission shift control, which includes the steps of:

providing an automated twin-clutch transmission including a first transmission unit with a first transmission input shaft, a first engine clutch and a first group of gears and a second transmission unit with a second transmission input shaft, a second engine clutch and a second group of gears;

executing a shifting operation between a load gear assigned to the first transmission unit and a target gear assigned to the first transmission unit as a multiple shifting operation by using an intermediate gear assigned to the second transmission unit and by performing a shifting step S1 including engaging the intermediate gear, performing a shifting step S2 including a clutch change-over from the first engine clutch assigned to the load gear to the second engine clutch assigned to the intermediate gear, performing a shifting step S3 including disengaging the load gear, performing a shifting step S4 including engaging the target gear, and performing a shifting step S5 including a clutch change-over from the second engine clutch assigned to the intermediate gear to the first engine clutch assigned to the target gear;

adjusting an engine speed of an assigned drive engine to reach a synchronous speed of the target gear at an end of the shifting operation;

setting, at a start of the shifting operation, an initial target speed gradient according to which the engine speed reaches the synchronous speed at the end of the shifting operation based on an estimated total shifting time;

adjusting the engine speed of the drive engine at the start of the shifting operation according to the initial target speed gradient;

determining an actual shifting progress during the shifting operation and comparing the actual shifting progress with an estimated shifting progress; and adjusting a target speed gradient to the actual shifting progress in case the actual shifting progress and the estimated shifting progress deviate from one another.

In other words, according to the invention, there is provided a method for controlling the shifting of an automated twin-clutch transmission including a first transmission unit with a first transmission input shaft, a first engine clutch and a first group of gears and a second transmission unit with a second transmission input shaft, a second engine clutch and a second group of gears, with which a shifting operation between a load gear and a target gear assigned to the same transmission unit is executed by using an intermediate gear assigned to the other transmission unit as a multiple shifting mechanism including the following shifting steps:

S1: engaging the intermediate gear;
S2: performing a clutch change from the engine clutch of the load gear to the engine clutch of the intermediate gear;
S3: releasing the load gear;
S4: engaging the target gear;
S5: performing a clutch change from the engine clutch of the intermediate gear to the engine clutch of the target gear; and adjusting the engine speed $n_M$ of the assigned drive engine to attain the synchronous speed $n_{MS}$ of the target gear at the end of the shifting operation, wherein at the start of the shifting operation ($t=t_0$), an initial target speed gradient $(dn_M/dt)_0$ is predetermined with which the engine speed $n_M$ reaches the synchronous speed $n_{MS}$ at the end of the shifting operation in an estimated total shifting time $\Delta t_{S\Sigma}'$ and wherein the engine speed $n_M$ of the drive engine at the start of the shifting operation is first changed according to the predetermined initial target speed gradient $(dn_M/dt)_0$ and wherein during the shifting operation the actual shifting progress is determined and compared with the estimated shifting progress, and wherein the target speed gradient $dn_M/dt$ is adjusted to the actual shifting progress when a deviation is determined in the shifting progress.

Another mode of the method according to the invention includes adjusting the target speed gradient $dn_M/dt$ by replacing a previously valid target speed gradient by a corrected target speed gradient $(dn_M/dt)_{kor}$ according to which the engine speed $n_M$ reaches the synchronous speed $n_{MS}$ at the end of the shifting operation based on an estimated remaining shifting time $\Delta t_{SR}'$.

Another mode of the method according to the invention includes performing the steps of determining the actual shifting progress and, if required, adjusting the target speed gradient $dn_M/dt$ after finishing each of the shifting steps S1 to S4 but not after finishing the shifting step S5.

Yet another mode of the method according to the invention includes determining the initial target speed gradient $(dn_M/dt)_0$ by determining, at the start of the shifting operation, a current engine speed as an initial engine speed $n_{M0}$ and the synchronous speed $n_{MS}$ of the target gear and by calculating the initial target speed gradient as a quotient of a difference between the synchronous speed $n_{MS}$ and the initial engine speed $n_{M0}$ and an in advance known estimated total shifting time $\Delta t_{S\Sigma}'$.

Another mode of the method according to the invention includes calculating the estimated total shifting time $\Delta t_{S\Sigma}'$ as a sum of estimated partial shifting times $\Delta t_{Si}'$ of the shifting steps S1 to S5.

A further mode of the method according to the invention includes determining the estimated total shifting time $\Delta t_{S\Sigma}'$ and/or the estimated partial shifting times $\Delta t_{Si}'$ beforehand in test bench trials and/or road trials; and storing the estimated total shifting time and/or the estimated partial shifting times in a transmission data memory.

A further mode of the method according to the invention includes determining a corrected target speed gradient $(dn_M/dt)_{kor}$ by determining a current engine speed $n_M$ and calculating the corrected target speed gradient as a quotient of a difference between the synchronous speed $n_{MS}$ and the current engine speed $n_m$ and an in advance known estimated remaining shifting time $\Delta t_{SR}'$.

Yet a further mode of the method according to the invention includes calculating an estimated remaining shifting time $\Delta t_{SR}'$ as a sum of estimated partial shifting times $\Delta t_{Si}'$ of still pending shifting steps.

Another mode of the method according to the invention includes that in case the actual shifting progress and the estimated shifting progress deviate from one another a stored estimated total shifting time $\Delta t_{S\Sigma}'$, a stored estimated remaining shifting time $\Delta t_{SR}'$ and/or a stored estimated partial shifting time $\Delta t_{Si}'$ are corrected by using actual shifting time values of the total shifting time $\Delta t_{S\Sigma}$, the remaining shifting time $\Delta t_{SR}$ and/or the partial shifting time $\Delta t_{Si}$.

Another mode of the method according to the invention includes correcting a stored estimated total shifting time $\Delta t_{S\Sigma}'$, a stored estimated remaining shifting time $\Delta t_{SR}'$ and/or a stored estimated partial shifting time $\Delta t_{Si}'$ by replacing the stored shifting time values with actual shifting time values of the total shifting time $\Delta t_{S\Sigma}$, the remaining shifting time $\Delta t_{SR}$ and/or the partial shifting time $\Delta t_{Si}$.

Yet another mode of the method according to the invention includes correcting a stored estimated total shifting time $\Delta t_{S\Sigma}'$, a stored estimated remaining shifting time $\Delta t_{SR}'$ and/or a stored estimated partial shifting time $\Delta t_{Si}'$ with a correction function using actual shifting time values of the total shifting time $\Delta t_{S\Sigma}$, the remaining shifting time $\Delta t_{SR}$ and/or the partial shifting time $\Delta t_{Si}$.

Another mode of the method according to the invention includes determining the initial target speed gradient $(dn_M/dt)_0$ and a corrected target speed gradient $(dn_M/dt)_{kor}$ such that the engine speed $n_M$ reaches the synchronous speed $n_{MS}$ at an end of shifting step S4.

Thus firstly, the engine speed $n_M$ is made to attain the synchronous speed $n_{MS}$ of the target gear by being controlled or regulated according to the predetermined, given initial target speed gradient $(dn_M/dt)_0$. At the desired point of time at the end of the shifting operation the engine speed reaches the synchronous speed of the target gear, as long as the actual shift progress, i.e. the progression in terms of time of the shifting operation and/or the individual shifting steps S1–S5, matches the estimated shifting progress. However, if there are delays or accelerations in the shifting progression due to changes in the operating conditions, such as extreme operating temperatures or wear and tear of the shifting and synchronization elements, then these deviations are recognized using the process in accordance with the invention and compensated by an adjustment of the target speed gradient $dn_M/dt$. In case of a shifting progress that is determined to be faster in comparison with the estimated shifting progress, the absolute value of the target speed gradient $dn_M/dt$ is increased while in case of a slower shifting progress, the absolute value of the target speed gradient is decreased. Thus the process in accordance with the invention causes the engine speed $n_M$ to reach the synchronous speed $n_{MS}$ at the right point of time at the end of the shifting operation. This method thus effectively avoids the waiting period that occurs usually in conventional methods in case of a faster shifting progress until the engine speed $n_M$ reaches the synchronous speed $n_{MS}$. In the reverse case also, the process in accordance with the invention effectively avoids the phase commonly occurring in conventional methods in case of a slower shifting progress in which the engine speed $n_M$ must largely be kept constant at the synchronous speed $n_{MS}$. The method in accordance with the invention thus ensures that the shifting progression of the aforementioned multiple shifting operation proceeds as fast and as comfortably as possible. The method is preferably used for downshifting under traction. However, the method can also be used for upshifting under traction, downshifting under overrun conditions and up-shifting under overrun conditions.

The target speed gradient $dn_M/dt$ is adjusted advantageously by replacing the hitherto effective target speed gradient $dn_M/dt$ by a corrected target speed gradient $(dn_M/dt)_{kor}$ with which the engine speed $n_M$ reaches the synchronous speed $n_{MS}$ at the end of the shifting operation in an estimated remaining shifting time $\Delta t_{SR}'$.

Since a continuous monitoring of the shifting progress and a more or less continuous adjustment of the target speed gradient $dn_M/dt$ would be too complex, the shifting progress is determined and the target speed gradient $dn_M/dt$ is adjusted if necessary after the conclusion of each the shifting steps S1–S4. Since however it does not make sense to correct the target speed gradient $dn_M/dt$ after the last shifting step S5, the target speed gradient is adjusted only up to the last but one shifting step S4. The engine speed $n_M$ may slightly deviate from the synchronous speed $n_{MS}$ at the end of the shifting operation and these deviations can be attributed to the deviations of the shifting progress in the last shifting step S5. These deviations must however be put up with.

The initial target speed gradient $(dn_M/dt)_0$ can be easily determined at the start of the shifting operation by recording the current engine speed $n_{M0}$ and the synchronous speed $n_{MS}$ of the target gear and by forming a quotient of the difference between the synchronous speed $n_{MS}$ and the initial engine speed $n_{M0}$ and an estimated total shifting time $\Delta t_{S\Sigma}'$ known in advance. The initial target speed gradient $(dn_M/dt)_0$ can thus be expressed as:

$$(dn_M/dt)_0 = (n_{MS} - n_{M0})/\Delta t_{S\Sigma}' \quad \text{(Eq. 1)}$$

For this purpose it is possible to calculate the estimated total shifting time $\Delta t_{S\Sigma}'$ as the sum of the estimated partial shifting times $\Delta t_{Si}'$ of the individual shifting steps S1–S5. The total shifting time $\Delta t_{S\Sigma}'$ can therefore be expressed as:

$$\Delta t_{S\Sigma}' = \Sigma \Delta t_{Si}' \text{ with } i = 1\text{–}5 \quad \text{(Eq. 2)}$$

The estimated total shifting time $\Delta t_{S\Sigma}'$ and/or the estimated partial shifting times $\Delta t_{Si}'$ are determined advantageously beforehand, i.e. during the development of the related twin-clutch transmission and/or the automobile, in test bench trials and/or road trials and are stored in a transmission data memory from which they can be read out whenever necessary.

Similarly, the corrected target speed gradient $(dn_M/dt)_{kor}$ can be easily determined by recording the current engine speed $n_M$ and by forming a quotient of the difference between the synchronous speed $n_{MS}$ and the current engine speed $n_m$ and an estimated remaining shifting time $\Delta t_{SR}'$ known in advance. The corrected target speed gradient $(dn_M/dt)_{kor}$ can therefore be expressed as:

$$(dn_M/dt)_{kor} = (n_{MS} - n_M)/\Delta t_{SR}' \quad \text{(Eq. 3)}$$

For this purpose, by using a discontinuous approach i.e. adjusting the target speed gradient $dn_M/dt$ at the end of each shifting step S1–S4, it is possible to calculate the estimated remaining shifting time $\Delta t_{SR}'$ as the sum of the estimated partial shifting times $\Delta t_{Si}'$ of the individual shifting steps SI+1–S5 that are still pending. The estimated remaining shifting time $\Delta t_{SR}'$ can thus be expressed as:

$$\Delta t_{SR}' = \Sigma \Delta t_{Si}' \text{ with } i = I+1\text{–}5 \quad \text{(Eq. 4)}$$

In the course of the operating time and/or lifespan of the twin-clutch transmission, wear-in processes and wear and tear of shifting and synchronization elements can result in a permanent displacement of the partial shifting times $\Delta t_{Si}$ and thus also a displacement of the remaining shifting times $\Delta t_{SR}$ and of the total shifting time $\Delta t_{S\Sigma}$. For the purpose of avoiding larger corrections of the target speed gradient $dn_M/dt$, particularly during the first shifting steps, it is therefore useful to correct the stored values of the estimated total shifting time $\Delta t_{S\Sigma}'$ and/or the estimated remaining shifting times $\Delta t_{SR}'$ and/or the estimated partial shifting times $\Delta t_{Si}'$ in case of deviations in the shifting progress by using the values of the actual shifting times $\Delta t_{S\Sigma}$ and/or $\Delta t_{SR}$ and/or $\Delta t_{Si}$. The easiest way of executing an adaptive correction of such type is by replacing the stored values of the estimated shifting times $\Delta t_{S\Sigma}'$ and/or $\Delta t_{SR}'$ and/or $\Delta t_{Si}'$ with the values of the actual shifting times $\Delta t_{S\Sigma}$ and/or $\Delta t_{SR}$ and/or $\Delta t_{Si}$. However, for the purpose of avoiding statistical outliers it is better to correct the stored values of the estimated shifting times $\Delta t_{S\Sigma}'$ and/or $\Delta t_{SR}'$ and/or $\Delta t_{Si}'$ with the values of the actual shifting times $\Delta t_{S\Sigma}$ and/or $\Delta t_{SR}$ and/or $\Delta t_{Si}$ by using a corrective function.

Since it is possible to more easily and quickly control the clutch change from the engine clutch of the intermediate gear to the engine clutch of the target gear at a constant engine speed $n_M$, the initial target speed gradient $(dn_M/dt)_0$ and the corrected target speed gradient $(dn_M/dt)_{kor}$ are determined advantageously if the engine speed $n_M$ reaches the synchronous speed $n_{MS}$ at the end of the last but one shifting step S4, i.e. within the meaning of the description provided so far of the process pursuant to the invention, the last but one shifting step S4 is considered as the last shifting step and the end of the last but one shifting step S4 is considered as the end of the shifting operation.

Other features which are considered as characteristic for the invention are set forth in the appended claims.

Although the invention is illustrated and described herein as embodied in a method for controlling the shifting of an automated twin-clutch transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
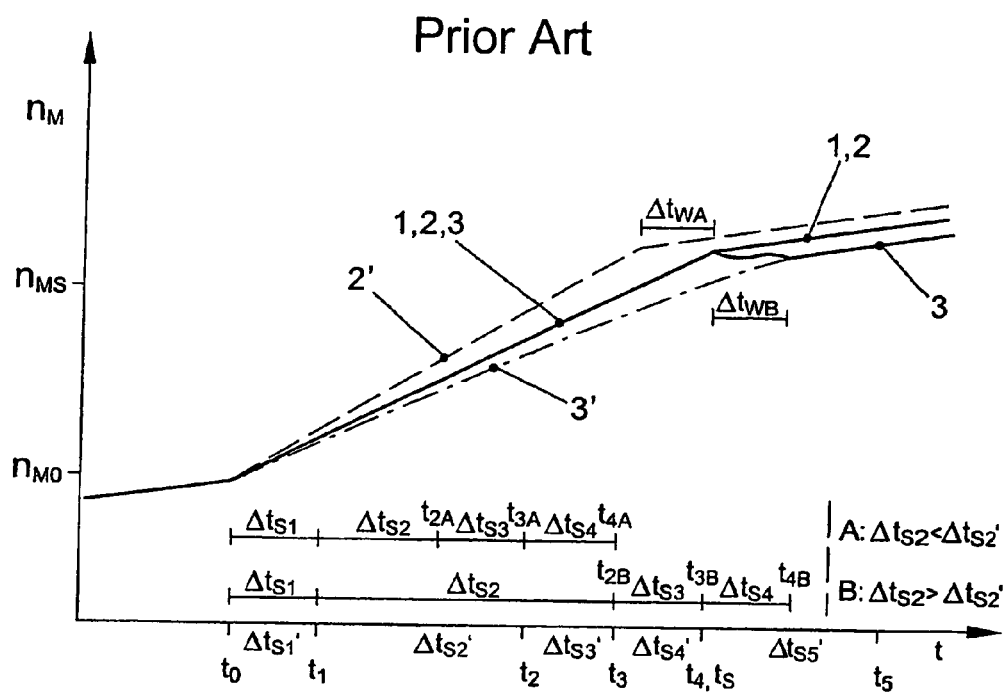
FIG. 2 is a timing diagram illustrating the engine speed over time in a shifting operation that is controlled in accordance with the prior art.

Referring now to the figures of the drawings in detail and first, particularly, to FIG. 2 thereof, there is shown the progression in terms of time of a down-shift of a twin-clutch transmission under traction wherein the down-shift is executed as a multiple shifting operation of the aforementioned type and the down-shift proceeds in accordance with prior art. For this FIG. 2 contains the progression of the engine speed nm of an assigned drive engine over the time t during the shifting operation that includes a total of five shifting steps. In the first shifting step S1, the intermediate gear is engaged, in the second shifting step S2 the clutch is changed over from the engine clutch of the load gear to the engine clutch of the intermediate gear, in the third shifting step S3 the load gear is disengaged, in the fourth shifting step S4 the target gear is engaged and in the fifth shifting step S5 the clutch is changed over from the engine clutch of the intermediate gear to the engine clutch of the target gear. Since the last clutch change can be controlled and/or regulated more easily and quickly at constant engine speed, it is provided that the engine speed $n_M$ reaches the synchronous speed $n_{MS}$ of the target gear at the end of the last but one shifting step S4. The last clutch change can then take place at a nearly constant engine speed, namely at the synchronous speed $n_{MS}$.

The shifting operation begins at the point of time $t_0$ and ends at an estimated point of time $t_5$. However the prerequisite for this is that the individual shifting steps S1–S5 proceed as intended in terms of time, i.e. S1 between $t_0$ and $t_1$ with the estimated period of time $\Delta t_{S1}'$, S2 between $t_1$ and $t_2$ with the estimated period of time $\Delta t_{S2}'$, S3 between $t_2$ and $t_3$ with the estimated period of time $\Delta t_{S3}'$, S4 between $t_3$ and $t_4$ with the estimated period of time $\Delta t_{S4}'$, and S5 between $t_4$ and $t_5$ with the estimated period of time $\Delta t_{S5}'$. Thus the entire shifting operation proceeds in the intended span of time $\Delta t_{S\Sigma}'$. The intended estimated total shifting time $\Delta t_{S\Sigma}'$, which results from the sum of the intended partial shifting times $\Delta t_{Si}'$ with i=1–5, forms together with the speed difference between the synchronous speed $n_{MS}$ and the engine speed at the start of the shifting operation $n_{M0}$ the basis for determining a target speed gradient $dn_M/dt$. The engine speed nm is made to attain the synchronous speed $n_{MS}$ as per this target speed gradient $dn_M/dt$ during the shifting operation. As a result, the speed adjustment takes place during the shifting steps S1 to S4. Thus within the meaning of the process the last but one shifting step S4 can be considered as the last shifting step which means:

$$\Delta t_{S\Sigma}' = \Sigma \Delta t_{Si}' \text{ with } i=1-4 \tag{Eq. 5}$$

If the shifting progress, i.e. the actual period of time $\Delta t_{Si}$ of the individual shifting steps S1 to S4 or the actual total shifting time $\Delta t_{S\Sigma}$ matches the estimated shifting progress, i.e. $\Delta t_{Si} = \Delta t_{Si}'$ or $\Delta t_{S\Sigma} = \Delta t_{S\Sigma}'$, then the engine speed $n_M$ reaches the synchronous speed $n_{MS}$ of the target gear using the target speed gradient $dn_M/dt$ exactly at the desired point of time, namely at the end of shifting step S4, ($t_5=t_4$). The corresponding speed progression is illustrated by curve 1 (solid line). This ideal case however seldom matches the reality. Changing operating conditions such as different operating temperatures and wear and tear of shifting and synchronization elements of the related gear result in practice in deviations in the progression in terms of time of the shifting operation.

Two examples of such cases are illustrated here. In case A the entire shifting operation proceeds faster than expected since the actual period of time $\Delta t_{S2}$ of the second shifting step S2 turns out to be shorter than expected ($\Delta t_{S2} < \Delta t_{S2}'$) Consequently, the fourth shifting step S4 concludes already at the point of time $t_{4A}$ whereas the engine speed $n_M$ according to curve 2 (=curve 1) reaches the synchronous speed $n_{MS}$ only at the point of time $t_4$. This results in an waiting time or idle time $\Delta t_{WA}$ in which the further shift progression has to wait until the synchronous speed $n_{MS}$ is reached. The ideal speed progression (desired progression) in this case is illustrated by the curve 2' (dashed line). In case B, the entire shifting operation proceeds slower than expected since the actual period of time $\Delta t_{S2}$ of the second shifting step S2 turns out to be longer than expected ($\Delta t_{S2} > \Delta t_{S2}'$). As a result, the fourth shifting step S4 concludes only at the point of time $t_{4B}$, whereas the engine speed $n_M$ according to curve 3 reaches the synchronous speed $n_{MS}$ already at the point of time $t_4$. In this case the engine speed $n_M$ must be maintained almost constant at the synchronous speed $n_{MS}$ until the conclusion of the fourth shifting step S4. Though this does not result in a real delay of the shifting progression, the driver does experience an apparent idle time due to the temporarily constant engine speed. The ideal speed progression (desired speed progression) in this case is illustrated by the curve 3' (dash-dotted line).

Figure 1:
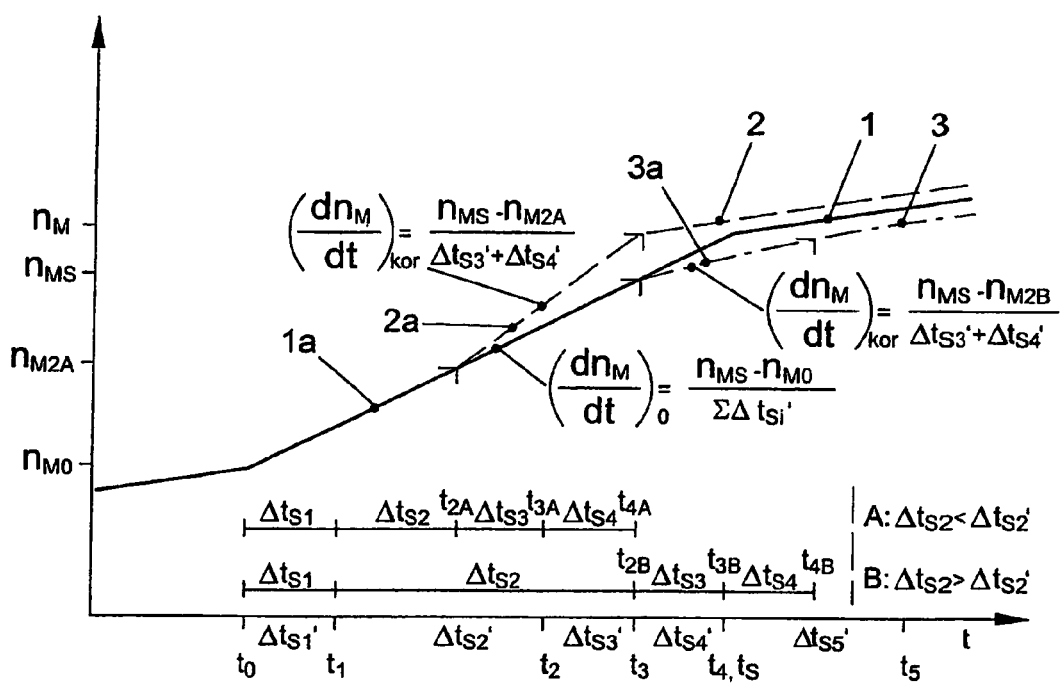
FIG. 1 is a timing diagram illustrating the engine speed over time in a shifting operation that is controlled in accordance with the invention.

The same shifting operation pursuant to the method of the invention proceeds in the manner as illustrated in FIG. 1. First an initial target speed gradient $(dn_M/dt)_0$ is predetermined through the use of which the engine speed nm reaches the synchronous speed $n_{MS}$ within the estimated total shifting time $\Delta t_{SS}'$ exactly at the end of the shifting operation, i.e. at the end of the fourth shifting step S4 in this case (see curve 1, 1a illustrated as a solid line). The engine speed $n_M$ of the drive engine at the start of the shifting operation can be changed according to this initial target speed gradient $(dn_M/dt)_0$ that, as stated above, can be calculated as the quotient of the difference between the synchronous speed $n_{MS}$ and the initial engine speed $n_{M0}$ and an estimated total shifting time $\Delta t_{SS}'$ that is known beforehand. The initial target speed gradient can thus be expressed as:

$$(dn_M/dt)_0 = (n_{MS} - n_{M0})/\Delta t_{SS}' \qquad \text{(Eq. 6)}$$

After the conclusion of each shifting step S1–S3, the actual shifting progress is determined and compared with the estimated shifting progress. In case of a determined deviation in the shifting progress from the estimated shifting progress, i.e. a substantial deviation of the actual partial shifting time $\Delta t_{Si}$ from the estimated partial shifting time $\Delta t_{Si}'$ of the shifting step that has just concluded, the target speed gradient $dn_M/dt$, which initially is identical to the initial target speed gradient $(dn_M/dt)_0$ is adjusted to the actual shifting progress. This adjustment is carried out advantageously by replacing the hitherto effective target speed gradient $dn_M/dt$ by a corrected target speed gradient $(dn_M/dt)_{kor}$ with which the engine speed $n_M$ reaches the synchronous speed $n_{MS}$ within an estimated remaining shifting time $\Delta t_{SR}'$ at the end of the shifting operation.

In the present description for the purpose of demonstrating the process pursuant to the invention FIG. 1 illustrates the examples of the same two cases illustrated earlier in FIG. 2 for the prior art. In case A the entire shifting operation proceeds faster than expected since the actual period of time $\Delta t_{S2}$ of the second shifting step S2 turns out to be shorter than expected ($\Delta t_{S2} < \Delta t_{S2}'$). However, this deviation is determined after the conclusion of the second shifting step S2 at the point of time $t_{2A}$. Thereupon, the hitherto effective target speed gradient according to which the engine speed was changed so far, is replaced by a corrected target speed gradient $(dn_M/dt)_{kor}$ with which the engine speed $n_m$ according to curve 2a (dashed line) reaches the synchronous speed $n_{MS}$ exactly at the desired point of time $t_{4A}$ at which the shifting operation (without the fifth shifting step S5) is concluded ahead of time. The absolute value of the corrected target speed gradient $(dn_M/dt)_{kor}$ is higher and can, as stated above, be calculated as the quotient of the difference between the synchronous speed $n_{MS}$ and the current engine speed $n_{M2A}$ and an estimated remaining shifting time $\Delta t_{SR}'$ that is known beforehand. The corrected target speed gradient can thus be expressed as:

$$(dn_M/dt)_{kor} = (n_{MS} - n_{M2A})/\Delta t_{SR}' \qquad \text{(Eq. 7)}$$

Here, the estimated remaining shifting time $\Delta t_{SR}'$ results from the sum of the estimated partial shifting times of the shifting steps S3 and S4, ($\Delta t_{SR}' = \Delta t_{S3}' + \Delta t_{S4}'$). Thus an idle time or waiting time $\Delta t_{WA}$ (see FIG. 2) that is common in the prior art in which the further shifting progression has to wait until the synchronous speed $n_{MS}$ is reached is effectively avoided. The actual speed progression for case A results from stringing together the partial curves 1a, 2a and 2.

In case B the entire shifting operation proceeds slower than expected, since the actual period of time $\Delta t_{S2}$ of the second shifting step S2 turns out to be longer than expected ($\Delta t_{S2} > \Delta t_{S2}'$). The resulting deviation is in turn determined after the conclusion of the second shifting step S2 at the point of time $t_{2B}$. Subsequently, the hitherto effective target speed gradient is replaced by a corrected target speed gradient $(dn_M/dt)_{kor}$ with which the engine speed $n_M$ according to curve 3a (dash-dotted line) reaches the synchronous speed $n_{MS}$ exactly at the desired point of time $t_{4B}$ at which the shifting operation (without the shifting step S5) is concluded behind schedule. The absolute value of the corrected target speed gradient $(dn_M/dt)_{kor}$ is reduced and can be calculated as before as the quotient of the difference between the synchronous speed $n_{MS}$ and the current engine speed $n_{M2B}$, here the engine speed $n_{M2B}$ at the end of shifting step S2, and an estimated remaining shifting time $\Delta t_{SR}'$ that is known beforehand. Thus the corrected target speed gradient can be expressed as:

$$(dn_M/dt)_{kor} = (n_{MS} - n_{M2B})/\Delta t_{SR}' \qquad \text{(Eq. 8)}$$

Thus an apparent idle time $\Delta t_{WA}$ (see FIG. 2) in which the engine speed $n_M$ must be kept substantially constant in order to wait until the end of the shifting operation, and/or the conclusion of the fourth shifting step S4 is effectively avoided. The actual speed now results from stringing together the partial curves 1a, 3a and 3.

The application of the control method pursuant to the invention, that provides for a monitoring of the shifting progress and an adjustment, if necessary and/or correction of the target speed gradient $dn_M/dt$ at least after each shifting step enables the substantially simultaneous conclusion of the shifting operation itself, i.e. the engaging and disengaging of the gears involved and the first clutch change-over and the speed adjustment proceeding in parallel in a twin-clutch transmission in a multiple shifting operation of the aforementioned type.

LIST OF REFERENCE SYMBOLS $n_M$ engine speed
$n_{M0}$ $n_M$ at the start of the shifting operation
$n_{M2A}$ $n_M$ at the end of the shifting step S2 in the case A
$n_{M2B}$ $n_M$ at the end of the shifting step S2 in the case B
$n_{MS}$ synchronous speed
S1 first shifting step
S2 second shifting step
S3 third shifting step
S4 fourth shifting step
S5 fifth shifting step
SI ith shifting step, current shifting step
SI+1 (i+1)th shifting step, next shifting step
t time
$t_0$ t at the start of the shifting operation
$t_1$ t at the end of S1 (estimated)
$t_2$ t at the end of S2 (estimated)
$t_{2A}$ t at the end of S2 (actual, case A)
$t_{2B}$ t at the end of S2 (actual, case B)
$t_3$ t at the end of S3 (estimated)
$t_{3A}$ t at the end of S3 (actual, case A)
$t_{3B}$ t at the end of S3 (actual, case B)
$t_4$ t at the end of S4 (estimated)
$t_{4A}$ t at the end of S4 (actual, case A)
$t_{4B}$ t at the end of S4 (actual, case B)
$t_5$ t at the end of S5 (estimated)
$t_S$ t at which $n_{MS}$ is reached
$\Delta t_{S1}$ period of time of S1 (actual)
$\Delta t_{S1}'$ period of time of S1 (estimated)
$\Delta t_{S2}$ period of time of S2 (actual)
$\Delta t_{S2}'$ period of time of S2 (estimated)
$\Delta t_{S3}$ period of time of S3 (actual)
$\Delta t_{S3}'$ period of time of S3 (estimated)
$\Delta t_{S4}$ period of time of S4 (actual)

$\Delta t_{S4}'$ period of time of S4 (estimated)
$\Delta t_{S5}'$ period of time of S5 (estimated)
$\Delta t_{Si}$ period of time of the ith shifting step (actual)
$\Delta t_{Si}'$ period of time of the ith shifting step (estimated)
$\Delta t_{SR}$ period of time of the remaining shifting steps, remaining shifting time (actual)
$\Delta t_{SR}'$ period of time of the remaining shifting steps, remaining shifting time (estimated)
$\Delta t_{S\Sigma}$ period of time of all shifting steps, total shifting time (actual)
$\Delta t_{S\Sigma}'$ period of time of all shifting steps, total shifting time (estimated)
$\Delta t_{WA}$ idle time in case A
$\Delta t_{WB}$ (apparent) idle time in case B
$dn_M/dt$ target speed gradient
$(dn_M/dt)_0$ initial target speed gradient
$(dn_M/dt)_{kor}$ corrected target speed gradient

We claim:

1. A method for a transmission shift control, the method which comprises:
   providing an automated twin-clutch transmission including a first transmission unit with a first transmission input shaft, a first engine clutch and a first group of gears and a second transmission unit with a second transmission input shaft, a second engine clutch and a second group of gears;
   executing a shifting operation between a load gear assigned to the first transmission unit and a target gear assigned to the first transmission unit as a multiple shifting operation by using an intermediate gear assigned to the second transmission unit and by performing a shifting step S1 including engaging the intermediate gear, performing a shifting step S2 including a clutch change-over from the first engine clutch assigned to the load gear to the second engine clutch assigned to the intermediate gear, performing a shifting step S3 including disengaging the load gear, performing a shifting step S4 including engaging the target gear, and performing a shifting step S5 including a clutch change-over from the second engine clutch assigned to the intermediate gear to the first engine clutch assigned to the target gear;
   adjusting an engine speed of an assigned drive engine to reach a synchronous speed of the target gear at an end of the shifting operation;
   setting, at a start of the shifting operation, an initial target speed gradient according to which the engine speed reaches the synchronous speed at the end of the shifting operation based on an estimated total shifting time;
   adjusting the engine speed of the drive engine at the start of the shifting operation according to the initial target speed gradient;
   determining an actual shifting progress during the shifting operation and comparing the actual shifting progress with an estimated shifting progress; and
   adjusting a target speed gradient to the actual shifting progress in case the actual shifting progress and the estimated shifting progress deviate from one another.

2. The method according to claim 1, which comprises adjusting the target speed gradient by replacing a previously valid target speed gradient by a corrected target speed gradient according to which the engine speed reaches the synchronous speed at the end of the shifting operation based on an estimated remaining shifting time.

3. The method according to claim 1, which comprises performing the steps of determining the actual shifting progress and, if required, adjusting the target speed gradient after finishing each of the shifting steps S1 to S4 but not after finishing the shifting step S5.

4. The method according to claim 1, which comprises determining the initial target speed gradient by determining, at the start of the shifting operation, a current engine speed as an initial engine speed and the synchronous speed of the target gear and by calculating the initial target speed gradient as a quotient of a difference between the synchronous speed and the initial engine speed and an in advance known estimated total shifting time.

5. The method according to claim 4, which comprises calculating the estimated total shifting time as a sum of estimated partial shifting times of the shifting steps S1 to S5.

6. The method according to claim 4, which comprises:
   determining the estimated total shifting time beforehand in at least one of test bench trials and road trials; and
   storing the estimated total shifting time in a transmission data memory.

7. The method according to claim 5, which comprises:
   determining the estimated partial shifting times beforehand in at least one of test bench trials and road trials; and
   storing the estimated partial shifting times in a transmission data memory.

8. The method according to claim 1, which comprises determining a corrected target speed gradient by determining a current engine speed and calculating the corrected target speed gradient as a quotient of a difference between the synchronous speed and the current engine speed and an in advance known estimated remaining shifting time.

9. The method according to claim 1, which comprises calculating an estimated remaining shifting time as a sum of estimated partial shifting times of still pending shifting steps.

10. The method according to claim 1, which comprises correcting a stored time value selected from the group consisting of a stored estimated total shifting time, a stored estimated remaining shifting time and a stored estimated partial shifting time by using at least one actual time value selected from the group consisting of a total shifting time, a remaining shifting time, and a partial shifting time when the actual shifting progress and the estimated shifting progress deviate from one another.

11. The method according to claim 1, which comprises correcting a stored time value selected from the group consisting of a stored estimated total shifting time, a stored estimated remaining shifting time and a stored estimated partial shifting time by replacing the stored time value with an actual time value selected from the group consisting of a total shifting time, a remaining shifting time, and a partial shifting time when the actual shifting progress and the estimated shifting progress deviate from one another.

12. The method according to claim 1, which comprises correcting a stored time value selected from the group consisting of a stored estimated total shifting time, a stored estimated remaining shifting time and a stored estimated partial shifting time with a correction function using at least one actual time value selected from the group consisting of a total shifting time, a remaining shifting time, and a partial shifting time when the actual shifting progress and the estimated shifting progress deviate from one another.

13. The method according to claim 1, which comprises determining the initial target speed gradient and a corrected target speed gradient such that the engine speed reaches the synchronous speed at an end of shifting step S4.

* * * * *

UNITED STATES PATENT AND TRADEMARK OFFICE
CERTIFICATE OF CORRECTION

PATENT NO.        : 7,048,672 B2
APPLICATION NO. : 11/157029
DATED             : May 23, 2006
INVENTOR(S)       : Edgar Bothe et al It is certified that error appears in the above-identified patent and that said Letters Patent is hereby corrected as shown below:

Title, Page Item (30) should read as follows:

(30)    Foreign Application Priority Data
       Dec. 20, 2002 (DE) ........................102 61 872.0

Signed and Sealed this

Twenty-eighth Day of November, 2006

JON W. DUDAS
*Director of the United States Patent and Trademark Office*